US012583983B2

(12) United States Patent
Kim et al.

(10) Patent No.: US 12,583,983 B2
(45) Date of Patent: Mar. 24, 2026

(54) POLYIMIDE FILM HAVING HIGH DIMENSIONAL STABILITY, AND METHOD FOR MANUFACTURING SAME

(71) Applicant: PI Advanced Materials Co., Ltd., Chungcheongbuk-do (KR)

(72) Inventors: Dong-Young Kim, Chungcheongbuk-do (KR); Dae-Geon Yoo, Chungcheongbuk-do (KR); Dong-Young Won, Chungcheongbuk-do (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 511 days.

(21) Appl. No.: 18/034,983

(22) PCT Filed: Nov. 2, 2021

(86) PCT No.: PCT/KR2021/015673
§ 371 (c)(1),
(2) Date: May 2, 2023

(87) PCT Pub. No.: WO2022/098042
PCT Pub. Date: May 12, 2022

(65) Prior Publication Data
US 2023/0407021 A1     Dec. 21, 2023

(30) Foreign Application Priority Data

Nov. 4, 2020     (KR) ........................ 10-2020-0145822
Oct. 13, 2021     (KR) ........................ 10-2021-0135635

(51) Int. Cl.
*C08J 5/18*     (2006.01)
*C08G 73/10*     (2006.01)

(52) U.S. Cl.
CPC ................ *C08J 5/18* (2013.01); *C08G 73/10* (2013.01); *C08J 2379/08* (2013.01)

(58) Field of Classification Search
CPC ......... C08G 73/10; C08G 73/1067; C08J 5/18
See application file for complete search history.

(56) References Cited

U.S. PATENT DOCUMENTS

2008/0057299 A1* 3/2008 Adachi ................ H05K 1/0346
                                                    428/458
2008/0182112 A1 7/2008 Kaneshiro et al.

FOREIGN PATENT DOCUMENTS

| | | | |
|---|---|---|---|
| CN | 101232995 | A | 7/2008 |
| CN | 109575283 | A | 4/2019 |
| JP | 2005125588 | A | 5/2005 |
| JP | 2010533362 | A | 1/2009 |
| JP | 2009132154 | A | 6/2009 |
| JP | 2017177601 | A | 10/2017 |
| JP | 2019204977 | A | 11/2019 |
| KR | 10-2008-0034876 | A | 4/2008 |
| KR | 10-2008-0104194 | A | 12/2008 |
| KR | 10-2011-0012753 | A | 2/2011 |
| KR | 10-2011-0036961 | A | 4/2011 |
| KR | 10-1375276 | B | 3/2014 |
| KR | 10-2016-0002402 | A | 1/2016 |
| KR | 10-2019-0038383 | A | 4/2019 |
| KR | 10-2020-0060045 | A | 5/2020 |
| KR | 10-2020-0118027 | A | 10/2020 |
| KR | 10-2020-0120492 | A | 10/2022 |
| TW | 201643041 | A | 12/2016 |
| WO | 2007/086550 | A1 | 2/2007 |
| WO | 2016159104 | A | 10/2016 |
| WO | 2020105889 | A1 | 5/2020 |
| WO | 2020/209524 | A1 | 10/2020 |

OTHER PUBLICATIONS

Nam et al (KR 20140137160), published on Dec. 2, 2014.*
Yul et al (WO 2019194389), published on Oct. 10, 2019.*
International Search Report and Written Opinion from related PCT Application No. PCT/KR2021/015673, dated Nov. 2, 2021, 10 pages.

* cited by examiner

*Primary Examiner* — Gregory Listvoyb
(74) *Attorney, Agent, or Firm* — Brooks, Cameron & Huebsch, PLLC

(57)          ABSTRACT

The present invention provides: a polyimide film having excellent dimensional stability; and a method for manufacturing same, wherein the polyimide film has a coefficient of thermal expansion of 1 ppm/° C. to 5 ppm/° C., an elastic modulus of 9 GPa to 11.5 GPa, and a glass transition temperature of 340° C. to 400° C.

11 Claims, No Drawings

POLYIMIDE FILM HAVING HIGH DIMENSIONAL STABILITY, AND METHOD FOR MANUFACTURING SAME

TECHNICAL FIELD

The present disclosure relates to a polyimide film having high dimensional stability. More particularly, the present disclosure relates to a polyimide film having both high thermal dimensional stability and high hygroscopic dimensional stability and to a method of manufacturing the same.

BACKGROUND ART

Polyimides (PIs) have a strong aromatic main chain and imide rings that are chemically stable. PIs are polymeric materials having the highest level of heat resistance, chemical resistance, electrical insulation, chemical resistance, and weather resistance among organic materials.

Polyimide films are becoming increasingly popular as materials for use in various electronic devices that require the properties described above.

Examples of microelectronic components to which polyimide films are applicable include thin circuit boards with high circuit density and flexibility to support the weight reduction and miniaturization of electronic products. Polyimide films are widely used as insulating films for the thin circuit boards.

The thin circuit board has a structure in which a circuit including a metal foil clad is formed on an insulating film. The thin circuit board is generally referred to as a flexible metal foil clad laminate in a broad sense and as a flexible copper clad laminate (FCCL) in a narrower sense when using a copper plate as a metal foil clad.

Flexible metal foil clad laminates are manufactured by the following methods: (i) a casting method, in which polyamic acid as a polyimide precursor is casted or applied on a metal foil clad and then imidized; (ii) a metallization method, in which a metal layer is directly deposited onto a polyimide film by sputtering; and (iii) a laminating method, in which a polyimide film made from a thermoplastic polyimide and a metal foil clad are bonded to each other by heat and pressure.

Particularly, the metallization is a technique of forming a flexible metal foil clad laminate by sequentially depositing a tie layer and a seed layer by sputtering a metal such as copper on a polyimide film having a thickness of 20 to 38 μm. The metallization is advantageous in terms of being capable of forming an ultra-fine circuit having a circuit pattern pitch of pm or less, and the method is widely used to manufacture a flexible metal foil clad laminate for a chip on film (COF).

Polyimide films used in flexible metal foil clad laminates need to have high dimensional stability in the case where the flexible metal foil clad laminates are manufactured by the metallization method. Traditionally, dimensional stability refers to thermal dimensional stability represented by the coefficient of thermal expansion. However, hygroscopic dimensional stability represented by the coefficient of hygroscopic expansion is becoming increasingly as important as the thermal dimensional stability.

That is, although there is an increasing demand for polyimide films having both good thermal dimensional stability and good hygroscopic dimensional stability, there is a problem in that when designing polyimide films having high thermal dimensional stability represented by low thermal expansion coefficients, the hygroscopic dimensional stability of such polyimide films is deteriorated.

Therefore, there is an urgent need for polyimide films that are excellent in both thermal dimensional stability and hygroscopic dimensional stability.

Matters described in the background art above are intended only to aid understanding of the background of the disclosure, and thus matters not belonging to the prior art already known to those skilled in the art to which the present disclosure pertains may also be described in the background art section.

DOCUMENTS OF RELATED ART

Patent Document (Patent Document 1) Korean Patent No. 10-1375276
(Patent Document 2) Korean Patent Application Publication No. 2016-0002402

Disclosure

Technical Problem

It is an objective of the present disclosure to provide a polyimide film having both high thermal dimensional stability and high hygroscopic dimensional stability.

The objectives to be achieved by the present disclosure are not limited to the ones mentioned above, and other objectives not mentioned above can be clearly understood by those skilled in the art from the following description.

Technical Solution

To achieve the objectives described above, one aspect of the present disclosure provides a polyimide film having a thermal expansion coefficient of 1 ppm/° C. or more and 5 ppm/° C. or less, an elastic modulus of 9 GPa or more to 5 GPa or less, and a glass transition temperature of 340° C. or more and 400° C. or less.

The polyimide film may have a hygroscopic expansion coefficient of 4 ppm/RH % or more and 6 ppm/RH % or less.

Another aspect of the present disclosure provides a polyimide film obtained by an imidization reaction of a polyamic acid solution including: an acid dianhydride component including at least two selected from the group consisting of biphenyltetracarboxylic dianhydride (BPDA), pyromellitic dianhydride (PMDA), oxydiphthalic dianhydride (ODPA), and benzophenontetracarboxylic dianhydride (BTDA); and a diamine component including at least two selected from the group consisting of paraphenylene diamine (PPD), m-tolidine, oxydianiline (ODA), and 1,3-bisaminophenoxybenzene (TPE-R), in which based on a total content of 100 mol % of the diamine component, the content of the paraphenylene diamine is 10 mol % or more and 70 mol % or less, and the content of the m-tolidine is 25 mol % or more and 80 mol % or less.

Based on a total content of 100 mol % of the acid dianhydride component, the content of the biphenyltetracarboxylic dianhydride may be 30 mol % or more and 60 mol % or less, and the content of the pyromellitic dianhydride may be 40 mol % or more and 60 mol % or less.

In addition, based on the total content of 100 mol % of the acid dianhydride component, the content of the oxydiphthalic anhydride may be 20 mol % or less, and the content of the benzophenontetracarboxylic dianhydride may be 30 mol % or less, and based on the total content of 100 mol % of the diamine component, the content of the oxydianiline (ODA) may be 20 mol % or less, and the content of the 1,3-bisaminophenoxybenzene may be 20 mol % or less.

The molar ratio of the paraphenylene diamine to the biphenyltetracarboxylic dianhydride may be 0.3 or more and 2.5 or less, and the molar ratio of the m-tolidine to the pyromellitic dianhydride may be 0.6 or more and 1.5 or less.

In addition, a reaction molar ratio of the paraphenylene diamine to the biphenyltetracarboxylic dianhydride may be 1.05 or more and 1.2 or less, and a reaction molar ratio of the paraphenylene diamine and the m-tolidine to the pyromellitic dianhydride may be 0.9 or more and 0.99 or less.

Another aspect of the present disclosure provides a method of manufacturing a polyimide film, the method including:

(a) preparing a polyamic acid by polymerizing, in an organic solvent, an acid dianhydride component including at least two selected from the group consisting of biphenyltetracarboxylic dianhydride (BPDA), pyromellitic dianhydride (PMDA), oxydiphthalic dianhydride (ODPA), and benzophenontetracarboxylic dianhydride (BTDA), and a diamine component including at least two selected from the group consisting of paraphenylene diamine (PPD), m-tolidine, oxydianiline (ODA), and 1,3-bisaminophenoxybenzene (TPE-R); and (b) subjecting the polyamic acid to an imidization reaction, in which based on a total content of 100 mol % of the acid dianhydride component, the content of the biphenyltetracarboxylic dianhydride is 30 mol % or more and 60 mol % or less, and the content of the pyromellitic dianhydride is 40 mol % or more and 60 mol % or less, and based on a total content of 100 mol % of the diamine component, the content of the paraphenylene diamine is 10 mol % or more and 70 mol % or less, and the content of the m-tolidine is 25 mol % or more 80 mol % or less.

A further aspect of the present disclosure provides a flexible metal foil clad laminate including the polyimide film and an electrically conductive metal foil clad.

A yet further aspect of the present disclosure provides an electronic component including the flexible metal foil clad laminate.

Advantageous Effects

The present disclosure provides a polyimide film having a controlled composition ratio, reaction ratio, etc. of acid dianhydrides and diamines, whereby the polyimide film is excellent in both thermal dimensional stability and hygroscopic dimensional stability.

The polyimide film has applications in various fields where a polyimide film with excellent dimensional stability is required. For example, the applications of the polyimide film may include flexible metal foil clad laminates prepared by metallization or electronic components using the flexible metal foil clad laminate.

Best Mode

Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible.

The features of exemplary embodiments described herein are presented for illustrative purposes and do not exhaustively represent the technical spirit of the present disclosure. Accordingly, it should be appreciated that there will be various equivalents and modifications that can replace the exemplary embodiments at the time at which the present application is filed.

As used herein, the singular forms "a", "an", and "the" are intended to include the plural forms as well unless the context clearly indicates otherwise. It will be further understood that the terms "comprising", "including", or "having" when used in the present disclosure specify the presence of stated features, regions, integers, steps, operations, elements and/or components, but do not preclude the presence or addition of one or more other features, regions, integers, steps, operations, elements, components and/or combinations thereof.

As used herein, "acid dianhydrides" may refer to not only acid dianhydrides but also their precursors or derivatives, which they technically may not be acid dianhydrides but will nonetheless react with diamines to form polyamic acids which in turn will be converted to polyimides.

As used herein, "diamines" may refer to not only diamines but also their precursors or derivatives, which technically may not be diamines but will nonetheless react with dianhydrides to form polyamic acids which in turn will be converted to polyimides.

When amounts, concentrations, or other values or parameters herein are given as ranges, preferred ranges, or recitations of preferred upper and lower limit values, It should be understood as specifically disclosing all ranges formed by any pair of any upper limit or preferred value and any lower limit or preferred value, regardless of whether the ranges are separately disclosed.

When a range of numerical values is recited herein, the range is intended to include its endpoints and all integers and fractions between the endpoints, unless stated otherwise. It is intended that the scope of the present disclosure is not limited to the specific values mentioned when defining a range.

A polyimide film according to one embodiment of the present disclosure is obtained by an imidization reaction of a polyamic acid solution containing: acid dianhydride components including at least two selected from the group consisting of biphenyltetracarboxylic dianhydride (BPDA), pyromellitic dianhydride (PMDA), oxydiphthalic dianhydride (ODPA), and benzophenontetracarboxylic dianhydride (BTDA); and diamine components including at least two selected from the group consisting of paraphenylene diamine (PPD), m-tolidine, oxydianiline (ODA), and 1,3-bisaminophenoxybenzene (TPE-R). Herein, based on the total content of 100 mol % of the acid dianhydride component, the content of the biphenyltetracarboxylic dianhydride is 30 mol % or more and 60 mol % or less, and the content of the pyromellitic dianhydride is 40 mol % or more and 60 mol % or less, and based on the total content of 100 mol % of the diamine component, the content of the paraphenylene diamine is 10 mol % or more and 70 mol % or less, and the content of the m-tolidine content is 25 mol % or more and 80 mol % or less.

Preferably, based on the total content of 100 mol % of the acid dianhydride component, the content of the biphenyltetracarboxylic dianhydride may be 30 mol % or more and mol % or less, and the content of the pyromellitic dianhydride may be 45 mol % or more and 55 mol % or less.

Preferably, based on the total content of 100 mol % of the diamine component, the content of the paraphenylene diamine may be 15 mol % or more and 70 mol % or less.

The paraphenylene diamine used in the present disclosure is a rigid monomer. When the content of the paraphenylene diamine increases, the polyimide synthesized from the paraphenylene diamine is more linear and has better mechanical properties.

In addition, the m-tolidine contains hydrophobic methyl groups which contribute to the low moisture absorption property related to the hygroscopic dimensional stability of the polyimide film.

The polyimide chain derived from the biphenyltetracarboxylic dianhydride of the present disclosure has a structure called a charge transfer complex (CTC). That is, it has a regular linear structure in which an electron donor and an electron acceptor are located close to each other, and intermolecular interactions are strengthened.

Since this structure prevents hydrogen bonding to moisture and contributes to lowering the moisture absorption rate, it is possible to maximize the effect of reducing the hygroscopicity of a polyimide film, which affects the dimensional stability against moisture (i.e., hygroscopic dimensional stability).

In addition, the pyromellitic dianhydride is an acid dianhydride component having a rigid structure and has an advantage of imparting appropriate elasticity to the polyimide film.

In order for the polyimide film to have excellent dimensional stability, the content ratio of acid dianhydrides is important. For example, when the content ratio of biphenyltetracarboxylic dianhydride is decreased, it is difficult to expect a low moisture absorption rate due to the CTC structure, and thus the hygroscopic dimensional stability is deteriorated.

In addition, the biphenyltetracarboxylic dianhydride contains two benzene rings as an aromatic component, whereas the pyromellitic dianhydride contains one benzene ring as an aromatic component.

The increase in the content of pyromellitic dianhydride in the acid dianhydride component can be understood as an increase in the number of imide groups in molecules for the same molecular weight. This means that in the polyimide polymer chain, the number of imide groups derived from pyromellitic dianhydride is larger than the number of imide groups derived from biphenyltetracarboxylic dianhydride.

That is, the increase in the content of pyromellitic dianhydride is a relative increase in the number of imide groups in the entire polyimide film. For this reason, it is difficult to expect good hygroscopic dimensional stability that is obtained due to a low moisture absorption rate.

Conversely, when the content ratio of pyromellitic dianhydride is decreased, the amount of a component having a rigid structure is reduced, whereby the elasticity of the polyimide film may be lowered to a desired level or less.

For this reason, when the content of biphenyltetracarboxylic dianhydride is over the range described above or the content of pyromellitic dianhydride is under the range described above, the dimensional stability of the polyimide film may be deteriorated.

Conversely, even when the content of biphenyltetracarboxylic dianhydride is under the range described above or the content of pyromellitic dianhydride is over the range described above, the dimensional stability of the polyimide film may be deteriorated.

In addition, based on the total content of 100 mol % of the acid dianhydride component, oxydiphthalic anhydride may be included in a content of 20 mol % or less, and benzophenontetracarboxylic dianhydride may be included in a content of 30 mol % or less, and based on the total content of 100 mol % of the diamine component, oxydianiline (ODA) may be included in a content of 20 mol % or less, and 1,3-bisaminophenoxybenzene may be included in a content of 20 mol % or less.

In the composition of the polyimide film, the molar ratio of paraphenylene diamine to biphenyltetracarboxylic dianhydride (=mol % of paraphenylene diamine/mol % of biphenyltetracarboxylic dianhydride) may be 0.3 or more and 2.5 or less, and the molar ratio of m-tolidine to pyromellitic dianhydride (=mol % of m-tolidine/mol % of pyromellitic dianhydride) may be 0.6 or more and 1.5 or less.

In addition, regarding the reaction molar ratio of the acid dianhydride component and the diamine component for forming the polyimide film, the reaction molar ratio of paraphenylene diamine to biphenyltetracarboxylic dianhydride may be 1.05 or more and 1.2 or less, and the reaction molar ratio of paraphenylene diamine and m-tolidine to pyromellitic dianhydride may be 0.9 or more and 0.99 or less.

That is, in the reaction between the acid dianhydride component and the diamine component, 1 mole of biphenyltetracarboxylic dianhydride reacts with a certain mole within a range of 1.05 to 1.2 moles of paraphenylene diamine, and 1 mole of pyromellitic dianhydride reacts with a certain mole within a range of 0.9 to 0.99 mole of paraphenylene diamine and m-tolidine.

In addition, the reaction molar ratio of the sum of paraphenylene diamine and m-tolidine to pyromellitic dianhydride may be 0.9 or more and 0.95 or less.

The polyimide film has a thermal expansion coefficient in a range of 1 ppm/° C. or more and 5 ppm/° C. or less, an elastic modulus in a range of 9 GPa or more and 5 GPa or less, and a hygroscopic expansion coefficient in a range of 4 ppm/RH % or more and 6 ppm/RH % or less.

In addition, the polyimide film may have a glass transition temperature in a range of 340° C. or more and 400° C. or less. The polyimide film preferably has a glass transition temperature lower than 390° C.

In the present disclosure, the polyamic acid may be prepared by one of the following methods:

(1) a method in which the entire amount of the diamine components is first placed in a solvent, then the acid dianhydride components are added thereto so as to be substantially equimolar to the diamine components, followed by polymerization;

(2) a method in which the entire amount of the acid dianhydride components is first placed in a solvent, and the diamine components are then added thereto to be substantially equimolar to the acid dianhydride components, followed by polymerization;

(3) a method in which one or more diamine components of the total diamine components to be used are placed in a solvent, one or more acid dianhydride components of the total acid dianhydride components to be used are added thereto so as to be in a ratio of about 95 mol % to 105 mol % with respect to the diamine components present in the solvent, the remaining diamine components are then added, and the remaining acid dianhydride components are added so that the total amount of the diamine components is equimolar to the total amount of the acid dianhydride components, followed by polymerization;

(4) a method in which one acid dianhydride component is placed in a solvent, one diamine component is added thereto to be in a ratio of 95 mol % to 105 mol % with respect to the reactive component in the solvent, a different acid dianhydride component is added thereto, and the remaining diamine component is added thereto so that the total amount of the diamine components is equimolar to the total amount of the acid dianhydride components, followed by polymerization; and (5) a method in which one or more diamine components and one or more acid dianhydride components are reacted in a first solvent in which either the diamine components or the acid dianhydride components are present in an excessive amount, to form a first composition; one or more diamine components and one or more acid dianhydride components are reacted in a second solvent in which either the diamine components or the acid dianhydride components are present in an excessive amount, to form a second composition; and the first composition and the second composition are mixed and completely polymerized. Here, when the amount of the diamine components is excessive in the first composition, the amount of the acid dianhydride components is excessive in the second composition. Conversely, when the amount of the acid dianhydride components is excessive in the first composition, the amount of the diamine components is excessive in the second composition. That is, the total amount of the diamine components and the total amount of the acid dianhydride components are substantially equimolar to each other when the first composition and the second composition are mixed to be polymerized.

In one embodiment, a method of manufacturing a polyimide film according to the present disclosure may include:

(a) preparing a polyamic acid by polymerizing, in an organic solvent, acid dianhydride components including at least two selected from the group consisting of biphenyltetracarboxylic dianhydride (BPDA), pyromellitic dianhydride (PMDA), oxydiphthalic dianhydride (ODPA), and benzophenontetracarboxylic dianhydride (BTDA), and diamine components including at least two selected from the group consisting of paraphenylene diamine (PPD), m-tolidine, oxydianiline (ODA), and 1,3-bisaminophenoxybenzene (TPE-R); and (b) subjecting the polyamic acid to an imidization reaction, in which based on a total content of 100 mol % of the acid dianhydride component, the content of the biphenyltetracarboxylic dianhydride may be 30 mol % or more and mol % or less, and the content of the pyromellitic dianhydride may be 40 mol % or more and 60 mol % or less, and in which based on a total content of 100 mol % of the diamine component, the content of the paraphenylene diamine may be 10 mol % or more and 70 mol % or less, and the content of the m-tolidine may be 25 mol % or more 80 mol % or less.

In the present disclosure, the polymerization method of the polyamic acid described above will be referred to as a random polymerization method, and the polyimide film prepared from the polyamic acid of the present disclosure by the method described above can be desirably used to maximize the effect of increasing dimensional stability of a polyimide film.

However, since the polymerization methods described above produce polymers with relatively short repeating units in their chains, there may be limitations in exhibiting the excellent properties of the polymer chains derived from the acid dianhydride components. Therefore, the polyamic acid polymerization method that can be particularly preferably used in the present disclosure may be a block polymerization method.

On the other hand, the solvent used to synthesize polyamic acid is not particularly limited, and any solvent can be used if it can dissolve the polyamic acid. However, an amide-based solvent is preferably used.

Specifically, the organic solvent may be an organic polar solvent. Particularly, the organic solvent may be an aprotic polar solvent. One or more solvents selected from the group consisting of N,N-dimethylformamide (DMF), N,N-dimethylacetamide, N-methyl-pyrrolidone (NMP), gamma butyrolactone (GBL), and diglyme are preferably used, but the organic solvent used in the present disclosure is not limited thereto.

In one example, N,N-dimethylformamide and N,N-dimethylacetamide may be particularly preferably used as the organic solvent.

In addition, in the polyamic acid preparation process, a filler may be added for the purpose of improving various film properties, such as sliding properties, thermal conductivity, corona resistance, and loop hardness. The filler added is not particularly limited, but preferable examples of filler include silica, titanium oxide, alumina, silicon nitride, boron nitride, calcium hydrogen phosphate, calcium phosphate, mica, and the like.

The particle size of the filler is not particularly limited and may be determined depending on the film properties to be modified and on the type of filler added. Generally, the average particle size of the filler is in a range of from 0.05 to 100 μm, preferably a range of from 0.1 to 75 μm, more preferably a range of from 0.1 to 50 μm, and particularly preferably a range of from 0.1 to 25 μm.

When the particle size is smaller than the lower limit of the range, it is difficult to obtain the advantageous effect of the filler. On the other hand, when the size is larger than the upper limit of the range, the surface quality or mechanical properties of the formed film may be greatly deteriorated.

The amount of the filler added is not particularly limited and may be determined depending on the film properties to be improved and on the size of the filler added. Generally, the amount of the filler added is in a range of from 0.01 to 100 parts by weight, preferably a range of from 0.01 to 90 parts by weight, and more preferably a range of from 0.02 to 80 parts by weight, with respect to 100 parts by weight of a polyimide.

When the amount of the filler added is under the range, it is difficult to obtain the advantageous effect of the filler. On the other hand, when the amount of the filler added exceeds the range, the mechanical properties of the film may be deteriorated. The method of adding filler is not particularly limited, and any known method may be used.

In the present disclosure, the polyimide film may be manufactured by thermal imidization or chemical imidization.

The polyimide film also may be manufactured by a combined method of thermal imidization and chemical imidization.

The thermal imidization is a method of causing an imidization reaction using a source such as hot air or a dryer.

In the thermal imidization method, amic acid groups present in a gel film may be imidized by heat treatment at a variable temperature in a range of from 100° C. to 600° C. Particularly, amic acid groups in a gel film may be imidized by heat treatment in a range of from 200° C. to 500° C. and, more specifically, a range of from 300° C. to 500° C.

However, a portion of the amic acid (about 0.1 mol % to 10 mol %) may be imidized even in the process of forming the gel film. To this end, the polyamic acid composition may be dried in a variable temperature range of 50° C. to 200° C. This process can be classified as the thermal imidization method.

In the case of chemical imidization, a polyimide film may be prepared using a dehydrant and an imidization agent, by a method known in the art.

In one exemplary combined imidization method, a dehydrant and an imidization agent are added to a polyamic acid solution, the mixture is then heated to a temperature range of 80° C. to 200° C. and preferably a temperature range of 100° C. to 180° C. to be partially cured and dried, and the heat treated mixture is then heated in a temperature range of 200° C. to 400° C. for 5 to 400 seconds to produce a polyimide film.

The present disclosure provides a flexible metal foil clad laminate including the polyimide film described above and an electrically conductive metal foil clad.

The metal foil clad used herein is not particularly limited, but in the case of using the flexible metal foil clad laminate of the present disclosure for electronic or electrical components, the metal foil clad may be, for example, a copper or copper alloy foil clad, a stainless steel or stainless steel alloy foil clad, a nickel or nickel alloy foil clad (including 42 alloy), or an aluminum or aluminum alloy foil clad.

In typical flexible metal foil clad laminates, copper foil clads such as rolled copper foil clad and electrolytic copper foil clad are commonly used, and they can be preferably used in the present disclosure as well. Moreover, the metal foil clads may be coated with a rust prevention layer, a heat resistance layer, or an adhesive layer.

In the present disclosure, the thickness of the metal foil clad is not particularly limited, and the metal foil clads may have any thickness capable of exhibiting sufficient functions depending on their use.

The flexible metal foil clad laminate according to the present disclosure may have a structure in which a metal foil clad is laminated on at least one side of a polyimide film.

Mode for Invention

Hereinafter, the actions and effects of the present disclosure will be described in more detail with reference to specific examples and preparation examples of the present disclosure. However, the examples and preparation examples are presented only on the illustrative purposes, and the scope of the present disclosure is not limited thereby.

Preparation Example: Preparation of Polyimide Film

Polyimide films according to the present disclosure can be manufactured by conventional methods known in the art. First, an organic solvent is reacted with an acid dianhydride component and a diamine component to obtain a polyamic acid solution.

In this case, the solvent may be an amide-based solvent, which is an aprotic polar solvent. For example, N,N'-dimethylformamide, N,N'-dimethylacetamide, N-methyl-pyrrolidone, or a combination thereof may be used as the solvent.

The acid dianhydride component and the diamine component may be added in the form of a powder, a mass, and a solution. Preferably, the acid dianhydride component and the diamine component may be added first in the form of a powder, and then the acid dianhydride component and the diamine component may be added in the form of a solution to control the polymerization viscosity.

The resulting polyamic acid solution may be mixed with an imidization catalyst and a dehydrant, and then the mixture is applied onto a support.

Examples of the catalyst used include, but are not limited to, tertiary amines (for example, isoquinoline, p-picoline, pyridine, etc.), and examples of the dehydrant include an acid anhydride. In addition, examples of the support may include, but are not limited to, a glass plate, an aluminum foil clad, a circulating stainless belt, or a stainless steel drum.

The film formed on the support is gelled on the support by dry air and heat treatment.

The gelled film is separated from the support and is then heat treated to be dried. Thus, the imidization is completed.

The heat-treated film may be further heat-treated under constant tension to remove internal residual stresses generated during the film forming process.

Specifically, in a state in which nitrogen was injected into a reactor equipped with a stirrer and a nitrogen importing/exporting pipe, 500 ml of DMF was introduced into the reactor, and the temperature of the reactor was set to 30° C. Then, biphenyltetracarboxylic dianhydride (BPDA), pyromellitic dianhydride (PMDA), oxydiphthalic anhydride (ODPA), benzophenontetracarboxylic dianhydride (BTDA), paraphenylene diamine (PPD), m-tolidine, oxydianiline (ODA) and 1,3-bisaminophenoxybenzene (TPE-R) were added in a controlled composition ratio and in a predetermined order to be completely dissolved. Next, stirring was continued for 120 minutes while the reactor was heated to a temperature of 40° C. under a nitrogen atmosphere to prepare a polyamic acid having a primary reaction viscosity of 1,500 cP.

The polyamic acid thus prepared was stirred to give a final viscosity of 100,000 to 120,000 cP.

The catalyst and dehydrant in appropriate amounts were added to the prepared final polyamic acid, a polyimide film was prepared from the solution, using an applicator.

EXAMPLES AND COMPARATIVE EXAMPLES

As shown in Table 1 below, polyimide films were prepared according to the preparation example described above while the content of acid dianhydrides and the content of diamines were adjusted according to Examples 1 to 8 and Comparative Examples 1 to 7.

In Examples 1 to 7, the reaction molar ratio of paraphenylene diamine to biphenyltetracarboxylic dianhydride was adjusted to be in a range of 1.05 or more and 1.2 or less in Examples 1 to 7, and the reaction molar ratio of paraphenylene diamine and m-tolidine to pyromellitic dianhydride was adjusted to be in a range of 0.9 or more and or less.

TABLE 1

| | Acid dianhydride | | | | Diamine | | | |
|---|---|---|---|---|---|---|---|---|
| | BPDA | PMDA | ODPA | BTDA | m-Tolidine | PPD | ODA | TPE-R |
| Example 1 | 50 | 50 | — | — | 40 | 60 | — | — |
| Example 2 | 50 | 50 | — | — | 35 | 65 | — | — |
| Example 3 | 47 | 53 | — | — | 35 | 65 | — | — |
| Example 4 | 47 | 53 | — | — | 40 | 60 | — | — |
| Example 5 | 40 | 50 | 10 | — | 70 | 30 | — | — |
| Example 6 | 30 | 50 | — | 20 | 30 | 70 | — | — |
| Example 7 | 50 | 50 | — | — | 75 | 15 | 10 | — |
| Example 8 | 50 | 50 | — | — | 75 | 15 | — | 10 |
| Comparative Example 1 | 50 | 50 | — | — | 0 | 100 | — | — |
| Comparative Example 2 | 50 | 50 | — | — | 15 | 85 | — | — |
| Comparative Example 3 | 50 | 50 | — | — | 60 | 40 | — | — |
| Comparative Example 4 | 40 | 60 | — | — | 100 | 0 | — | — |
| Comparative Example 5 | 20 | 50 | 30 | — | 85 | 15 | — | — |
| Comparative Example 6 | 50 | 50 | — | — | 85 | 5 | — | 10 |
| Comparative Example 7 | 50 | 50 | — | — | 15 | 75 | 10 | — |

The elastic modulus, coefficient of thermal expansion (CTE), coefficient of hygroscopic expansion (CHE), and glass transition temperature (Tg) of each of the prepared polyimide films were measured. The results are shown in Table 2 below.

TABLE 2

| | Physical property | | | |
|---|---|---|---|---|
| | Elastic modulus (GPa) | CTE (ppm/° C.) | CHE (ppm/RH %) | Tg (° C.) |
| Example 1 | 10.5 | 1.8 | 4.5 | 343 |
| Example 2 | 9.5 | 4.4 | 5.3 | 353 |
| Example 3 | 9.1 | 2.5 | 4.6 | 373 |
| Example 4 | 10.3 | 1.6 | 4.3 | 382 |
| Example 5 | 9.7 | 4.9 | 5.8 | 343 |
| Example 6 | 9.3 | 2.2 | 5.7 | 370 |
| Example 7 | 11.2 | 3.1 | 5.5 | 341 |
| Example 8 | 11.1 | 3.5 | 5.8 | 342 |
| Comparative Example 1 | 8.6 | 0.2 | 7.0 | 390 |
| Comparative Example 2 | 9.0 | 1.5 | 6.5 | 410 |
| Comparative Example 3 | 11.9 | 5.7 | 3.8 | 327 |
| Comparative Example 4 | 11.7 | 6.0 | 5.9 | 295 |
| Comparative Example 5 | 11.5 | 7.0 | 6.5 | 300 |
| Comparative Example 6 | 12.2 | 2.1 | 5.0 | 310 |
| Comparative Example 7 | 8.8 | 2.4 | 6.0 | 390 |

(1) Measurement of Elastic Modulus

The elastic modulus of each of the polyimide films prepared in all Examples and Comparative Examples was measured three times according to the ASTM D 882 standard using a standard Instron® testing machine, and the average value was obtained.

(2) Measurement of Coefficient of Thermal Expansion

For the coefficient of thermal expansion (CTE), a thermomechanical analyzer (Q400 model) manufactured by TA Instruments was used. The polyimide films were cut into samples that were 4 mm wide and 20 mm long. The samples were first heated to 400° C. from room temperature at a heating rate of 10° C./min under a nitrogen atmosphere with the application of a tension load of 0.05 N, and then cooled to 50° C. at a cooling rate of 10° C./min. The slope in a temperature zone of 50° C. to 200° C. was measured.

(3) Measurement of Coefficient of Hygroscopic Expansion

To obtain the coefficient of hygroscopic expansion (CHE), the humidity was first adjusted to 3% RH, and the samples were made to absorb moisture until completely saturated, with the application of a minimum weight load (about 1 g for a sample of mm×150 mm) to prevent the polyimide film samples from loosening. In the state, the dimension of each sample was measured. After the measurement, the humidity was adjusted to 90% RH, and the samples were made to absorb moisture until completely saturated, followed by measurement of dimensions of the samples. From both the results, the dimensional change was obtained at a humidity of 90% RH per relative humidity difference of 87%.

(4) Measurement of Glass Transition Temperature

To obtain the glass transition temperature (Tg) of each sample, the loss modulus and storage modulus of each film sample were obtained using DMA, and an inflection point on each tangent graph was taken as the glass transition temperature.

The measurement results revealed that the polyimide films according to Examples 1 to 8 had a thermal expansion coefficient of 1 ppm/° C. or more and 5 ppm/° C. or less, an elastic modulus of 9 GPa or more and 11.5 GPa or less, and a hygroscopic expansion coefficient of 4 ppm/RH % or more and 6 ppm/RH % or less.

In contrast, in the case of Comparative Examples 1 and 2 in which m-tolidine was used in a small amount (15% by weight) or was not used at all, the film samples exhibited as good coefficient of thermal expansion as 1.5 ppm/° C. or less but as poor coefficient of hygroscopic expansion as 6.5 ppm/° C. That is, it was found that the films exhibited poor hygroscopic dimensional stability.

On the other hand, in the case of Comparative Example 7 in which oxydianiline and paraphenylene diamine were both used along with a small amount (15% by weight) of m-to-lidine as the diamine component, it was found that the elastic modulus was lowered to less than 9 GPa.

In the case of Comparative Examples 2 to 4, it was found that the glass transition temperatures of the films were lower or higher than the glass transition temperatures of the films of Examples.

In the case of Comparative Examples 3 and 4 in which m-tolidine was used in an excessive amount, the hygro-scopic expansion coefficient characteristics were relatively excellent (5.9 ppm/RH % or less), but the thermal expansion coefficient characteristics were measured to be 5.7 ppm/° C. or more, meaning that the thermal dimensional stability was low.

On the other hand, in the case of Comparative Example 5 in which m-m-tolidine was contained in an excessive amount and oxydiphthalic anhydride was used as an acid dianhydride component, it was found that the films were inferior to the films of the examples in terms of thermal dimensional stability were inferior and glass transition tem-perature (coefficient of thermal expansion: 7.0 ppm/° C., glass transition temperature: 300° C.)

In the case of Comparative Example 6 in which 1,3-bisaminophenoxybenzene was used as a diamine component and m-tolidine was contained in an excessive amount, the elastic modulus (elastic modulus: 12.2 GPa) was excessively high compared to those of Examples, and the glass transition temperature was lowered (glass transition temperature: 310° C.)

In summary, the polyimide films of Examples 1 to 8 of the present disclosure, in which each component was used in an appropriate amount within the preferred ranges described above, exhibited excellent properties in both thermal dimen-sional stability and hygroscopic dimensional stability. How-ever, in the case where the necessary ingredients were used in amounts outside the preferred ranges of the present disclosure, it was found that it was difficult to obtain polyimide films being excellent in terms of both thermal dimensional stability and hygroscopic dimensional stability.

In addition, it was confirmed that the polyimide films of Examples 1 to 8 in which the necessary ingredients were used in appropriate amounts within the preferred ranges exhibited appropriate properties suitable for various appli-cations in terms of elastic modulus and glass transition temperature.

That is, it was confirmed that polyimide films having excellent dimensional stability and satisfying all the various conditions required for applications in various industrial fields were polyimide films manufactured from the compo-sitions in which the contents of the components were within the appropriate ranges presented by the present disclosure.

The examples and preparation example regarding the polyimide film and manufacturing method according to the present disclosure are only preferred examples that enable those skilled in the art to easily practice the inventions, and it should be understood that the scope of the present disclo-sure is not limited by the examples and preparation example. Therefore, the true technical protection scope of the present disclosure will be defined by the technical spirit of the appended claims. In addition, it will be clear to those skilled in the art that various substitutions, modifications, and changes are possible without departing from the technical spirit of the present disclosure, and it is obvious that parts easily changeable by those skilled in the art will also fall within the scope of the present disclosure.

INDUSTRIAL APPLICABILITY

The present disclosure provides a polyimide film having a controlled composition ratio, reaction ratio, etc. of acid dianhydrides and diamines, whereby the polyimide film is excellent in both thermal dimensional stability and hygro-scopic dimensional stability.

The polyimide film has applications in various fields where a polyimide film with excellent dimensional stability is required. For example, the applications of the polyimide film may include flexible metal foil clad laminates prepared by metallization or electronic components using the flexible metal foil clad laminate.

The invention claimed is:

1. A polyimide film obtained by an imidization reaction of a polyamic acid solution comprising:
   an acid dianhydride component including at least two selected from the group consisting of biphenyltetrac-arboxylic dianhydride (BPDA), pyromellitic dianhy-dride (PMDA), oxydiphthalic dianhydride (ODPA), and benzophenonetetracarboxylic dianhydride (BTDA); and
   a diamine component including at least two selected from the group consisting of paraphenylene diamine (PPD), m-tolidine, oxydianiline (ODA), and 1,3-bisaminophe-noxybenzene (TPE-R),
   wherein based on a total content of 100 mol % of the diamine component, the content of the paraphenylene diamine is 10 mol % or more and 70 mol % or less, and the content of the m-tolidine is 25 mol % or more and 80 mol % or less,
   wherein the polyimide film has a thermal expansion coefficient of 1 ppm/° C. or more and 5 ppm/° C. or less, an elastic modulus of 9 GPa or more and 11.5 GPa or less, and a glass transition temperature of 340° C. or more and 400° C. or less, and
   wherein based on a total content of 100 mol % of the acid dianhydride component, the content of the biphenyltet-racarboxylic dianhydride is 30 mol % or more and 60 mol % or less, and the content of the pyromellitic dianhydride is 40 mol % or more and 60 mol % or less.

2. The polyimide film of claim 1, having a hygroscopic expansion coefficient of 4 ppm/RH % or more and 6 ppm/RH % or less.

3. The polyimide film of claim 1, wherein based on the total content of 100 mol % of the acid dianhydride compo-nent, the content of the oxydiphthalic anhydride is 20 mol % or less, and the content of the benzophenontetracarboxylic dianhydride is 30 mol % or less, and based on the total content of 100 mol % of the diamine component, the content of the oxydianiline (ODA) is 20 mol % or less, and the content of the 1,3-bisaminophenoxybenzene is 20 mol % or less.

4. The polyimide film of claim 1, wherein the paraphe-nylene diamine is comprised in a molar ratio of 0.3 or more and 2.5 or less with respect to the biphenyltetracarboxylic dianhydride.

5. The polyimide film of claim 1, wherein the m-tolidine is comprised in a molar ratio of 0.6 or more and 1.5 or less with respect to the pyromellitic dianhydride.

6. The polyimide film of claim 1, wherein a reaction molar ratio of the paraphenylene diamine to the biphenyltetracarboxylic dianhydride is 1.05 or more and 1.2 or less.

7. The polyimide film of claim 1, wherein a reaction molar ratio of the paraphenylene diamine and m-tolidine to the pyromellitic dianhydride is 0.9 or more and 0.99 or less.

8. A method of manufacturing a polyimide film, the method comprising:

(a) preparing a polyamic acid by polymerizing, in an organic solvent, an acid dianhydride component comprising at least two selected from the group consisting of biphenyltetracarboxylic dianhydride (BPDA), pyromellitic dianhydride (PMDA), oxydiphthalic dianhydride (ODPA), and benzophenontetracarboxylic dianhydride (BTDA), and a diamine component comprising at least two selected from the group consisting of paraphenylene diamine (PPD), m-tolidine, oxydianiline (ODA), and 1,3-bisaminophenoxybenzene (TPE-R); and (b) subjecting the polyamic acid to an imidization reaction, wherein based on a total content of 100 mol % of the acid dianhydride component, the content of the biphenyltetracarboxylic dianhydride is 30 mol % or more and 60 mol % or less, and the content of the pyromellitic dianhydride is 40 mol % or more and 60 mol % or less, and based on a total content of 100 mol % of the diamine component, the paraphenylene diamine is 10 mol % or more and 70 mol % or less, and the content of the m-tolidine is 25 mol % or more and 80 mol % or less, and wherein the polyimide film has a thermal expansion coefficient of 1 ppm/° C. or more and 5 ppm/° C. or less, an elastic modulus of 9 GPa or more and 11 GPa or less, and a glass transition temperature of 340° C. or more and 400° C. or less.

9. The method of claim 8, wherein based on the total content of 100 mol % of the acid dianhydride component, the content of the oxydiphthalic anhydride is 20 mol % or less, and the content of the benzophenontetracarboxylic dianhydride is 30 mol % or less, and wherein based on the total content of 100 mol % of the diamine component, the content of the oxydianiline (ODA) is 20 mol % or less, and the content of the 1,3-bisaminophenoxybenzene is 20 mol % or less.

10. The method of claim 8, wherein a reaction molar ratio of the paraphenylene diamine to the biphenyltetracarboxylic dianhydride is 1.05 or more and 1.2 or less, and a reaction molar ratio of the paraphenylene diamine and the m-tolidine to the pyromellitic dianhydride is 0.9 or more and 0.99 or less.

11. The method of claim 8, wherein the polyimide film has a hygroscopic expansion coefficient of 4 ppm/RH % or more and 6 ppm/RH % or less.

* * * * *